Nov. 26, 1935.    G. A. LYON    2,022,124
TIRE COVER
Filed Sept. 9, 1932
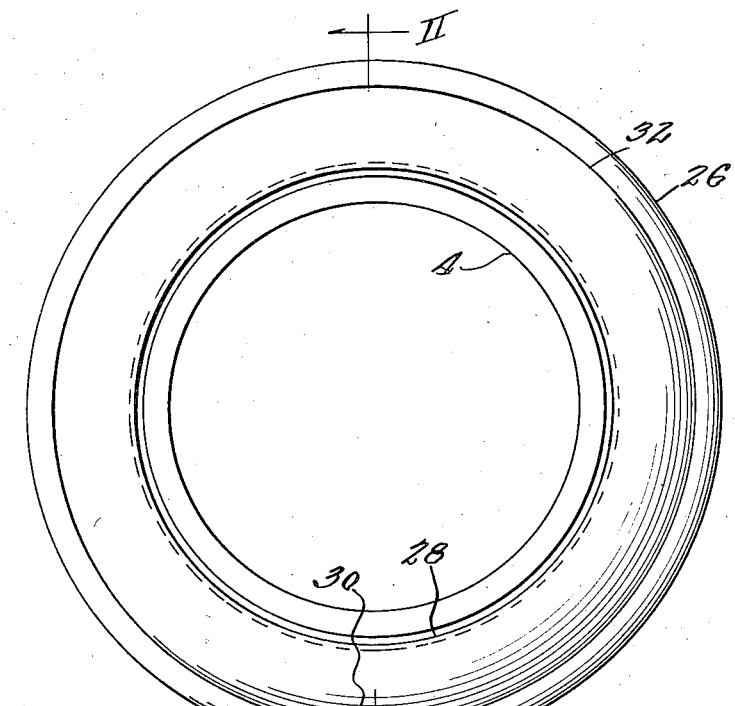
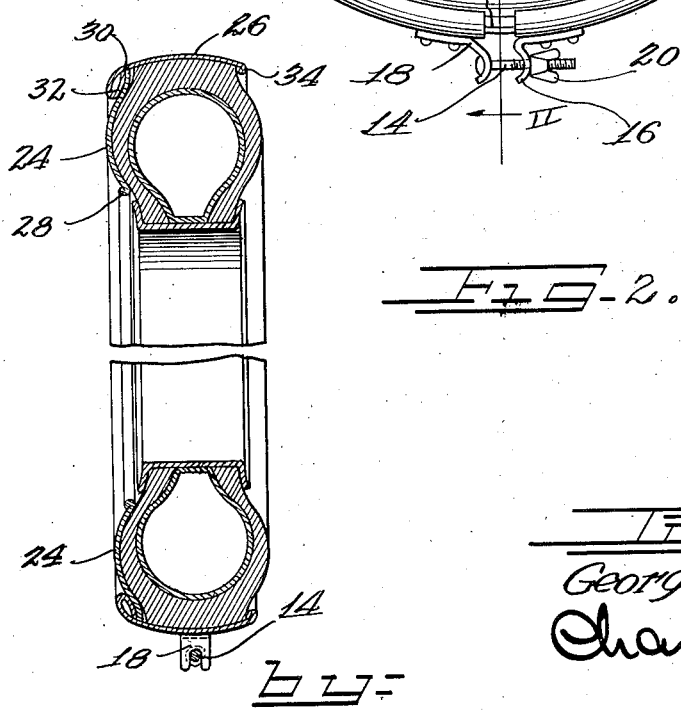
Inventor
George Albert Lyon Patented Nov. 26, 1935

2,022,124

UNITED STATES PATENT OFFICE 2,022,124

TIRE COVER

George Albert Lyon, Allenhurst, N. J., assignor to Lyon Incorporated, Asbury Park, N. J., a corporation of Delaware Application September 9, 1932, Serial No. 632,425

2 Claims. (Cl. 150—54)

This invention relates to covers for spare tires carried upon automobiles, and has been taken from my application Serial No. 315,455, filed October 27, 1928, issued as Patent No. 1,875,316, September 6, 1932.

The usual spare tire cover consists of a canvas casing coated with a waterproofing material and formed to fit the contour of the spare tire and carrier. These tire covers are unattractive in appearance and are subject to shrinkage so that they are difficult to apply to a tire after having been in use for a relatively short time. Such casings also often cannot be applied to a tire so that they will fit the tire smoothly. They also wear out quickly and are readily torn, particularly when struck by another car as often happens under congested traffic conditions. They also do not constitute a satisfactory protection for the tire against damage in case of collision. The ordinary tire cover, since it is made of a highly flexible material, not only wrinkles readily, but, when applied to a tire, conforms to the projections or roughnesses on the tire so that it does not present a smooth outer surface.

The principal object of the present invention is to produce a cover for spare tires of an automobile which has a highly attractive appearance, which may be readily applied to the tire, which is strong and durable in construction, which will protect the tire in a reliable manner against weather and damage from collision, and which will present a smooth outer surface at all times.

Another object of the invention is to provide an improved spare tire cover which will readily adjust itself to slight variations in the contour of the tire such for example as is present in the different makes of a given standard size of tire.

In accordance with the general features of the invention, there is provided an expansible and contractible split tread covering ring provided with means for positively contracting the same and whose margins are adapted to extend inwardly of the outermost periphery of the tire, the front margin serving as a stop to facilitate application of the cover. The front margin is preferably arranged so that its expansion is not interfered with by the tire. A side plate may be associated with the ring in such a manner as to be cammed toward the tire by the ring.

Other objects and advantages of this invention will more fully appear from the following detail description taken in connection with the accompanying drawing which illustrate several embodiments thereof and in which Figure 1 is a view in front elevation illustrating one form of my cover for spare tires embodying the invention;

Figure 2 is a detailed cross sectional view taken transversely through the tire and cover as indicated by the line II—II in Figure 1;

The present invention embodies a relatively non-flexible cover made of sheet material formed into the proper shape to constitute a protective covering for the tire. The cover, although it is relatively stiff so that it will maintain its shape without any inside support, may have sufficient resiliency to enable it to be expanded and contracted in applying the same to and removing the same from a tire. The cover may be made of various materials such as hard rubber, bakelite or cloth impregnated with stiffening material but it is preferably formed of sheet metal. In actual practice, a cover made of sheet metal has been found to give highly satisfactory results.

In the form of the invention shown in Figures 1 and 2 the tire cover comprises a cover member 24 for the side of a tire, which may be mounted on a spare tire carrier 4, and the cover member 26 arranged to cover the periphery of the tire, both of which are preferably formed of relatively stiff material such as sheet metal. In this construction the side cover member 24 is provided at its inner margin with an inturned cylindrical bead or curl indicated at 28, and its outer margin with an outturned bead 30. The margin of the cover member 26 which lies adjacent the cover member 24 when the tire cover is in place, is bent inwardly so as to overlap the outer margin of the cover member 24 upon the outside thereof as shown in Figure 2, and is provided with an inturned bead 32 at its edge for engagement with the side cover member 24. The cover member 24 is shaped in cross section to conform in shape to the side wall of the tire thereby forming an inclined surface which is engaged by the bead 32 on the cover member 26. The opposite margin of the cover member 26 is provided with an inturned bead 34.

The cover member 26 is made in the form of a preferably resilient expansible and contractible split ring, and is contracted to hold the cover in proper tire protecting position. The contracting means comprises a bolt 14 adapted to extend through a pair of brackets 16 and 18 mounted on the respective ends of the split ring 26, and a nut 20 to hold the parts in assembly. The opening in the bracket 18 is in the form of a slot permitting disengagement of the bolt. The opening in the bracket 16 is a hole preferably considerably larger than the shank of the bolt so that the bolt may be displaced from the position shown to a position wherein the head of the bolt is disengaged from the slotted bracket 18, when the nut 20 is backed away. The bracket 18 is so formed as to provide a concave surface engageable with the bolt head to prevent accidental disengagement of the head therefrom. The other bracket 16 is similarly formed for engagement with the wing nut 20 to permit angular movement therebetween.

When the cover has been applied to the tire, with the head of the bolt out of engagement with bracket 18 and the nut 20 backed away to provide clearance, the bolt is swung into the slot in the bracket 18. Then the nut is tightened, forcing the bolt head into engagement with the concave surface of the bracket, and contracting the split ring into proper covering relation to the tire and cooperation with the side plate 24.

As pointed out hereinabove the illustrated embodiment of the invention includes a split cover ring with inwardly extending marginal portions, the front portion extending inwardly to a further extent than the rear portion of the cover ring. The latter portion merely overhangs the rear side of the tread of the tire to an extent sufficient to enable the ring to hold itself on the tire against lateral displacement and yet at the same time permit of the ready application of the split ring to the tire.

Now it is of course to be understood that although I have illustrated and described in detail an embodiment of the invention, the invention is not to be thus limited but only insofar as defined by the scope and spirit of the appended claims.

I claim as my invention:

1. In a tire cover, an expansible and contractible sheet metal ring having a rear margin capable of assuming a sufficiently large diameter to pass across the outer periphery of the tire tread as the cover is applied and removed to enable the cover to be applied from and removed toward the front side of the tire, and of thereafter assuming a smaller diameter to overhang the tread at the rear thereof, the front margin being of less diameter than the tire tread when the rear margin is passed across the tread to provide a stop facilitating application of the cover to the tire and cooperate with the rear margin in holding the cover on the tire, an annular side plate for covering the front side wall of the tire and having a circular surface concentric with said plate and engageable with the front margin of the ring upon contraction of the ring, said surface affording an abutment in the direction of contraction of the front margin and being inclined, whereby engagement of said surface with said front margin results in a camming of the plate towards the tire and a centering of the plate relative to the ring.

2. In a tire cover, an expansible and contractible sheet metal ring having a rear margin capable of assuming a sufficiently large diameter to pass across the outer periphery of the tire tread as the cover is applied and removed to enable the cover to be applied from and removed toward the front side of the tire, and of thereafter assuming a smaller diameter to overhang the tread at the rear thereof, the front margin being of less diameter than the tire tread when the rear margin is passed across the tread so as to extend inwardly along the outer side wall of the tire and thus to provide a stop facilitating application of the cover to the tire and to cooperate with the rear margin in holding the cover on the tire, and means for positively holding said ring in contracted condition, said front margin terminating clear of the cavity bounded by the inwardly facing part of the front wall of the tire so that said part will not interfere with expansion of said ring.

GEORGE ALBERT LYON.